United States Patent [19]

Sheehan

[11] Patent Number: 5,149,036
[45] Date of Patent: Sep. 22, 1992

[54] DEVICE FOR ATTACHING AN IV POLE TO A HOSPITAL BED OR THE LIKE

[76] Inventor: Gerald F. Sheehan, 20440 Anza, #125, Torrance, Calif. 90503

[21] Appl. No.: 751,549

[22] Filed: Aug. 29, 1991

[51] Int. Cl.⁵ .............................................. F16L 3/08
[52] U.S. Cl. ......................................... 248/215; 5/658; 248/225.2; 248/304; 280/292
[58] Field of Search .................. 248/215, 219.3, 225.2, 248/227, 303, 304, 339, 340, 129, 230, 125, 218.4; 280/292; 5/503, 508

[56] References Cited

U.S. PATENT DOCUMENTS

| | | | |
|---|---|---|---|
| 2,696,963 | 12/1954 | Shepherd | 5/503 X |
| 3,425,127 | 2/1969 | Long et al. | 248/230 X |
| 4,600,209 | 7/1986 | Kerr, Jr. | 5/503 X |
| 4,945,592 | 8/1990 | Sims et al. | 248/129 X |
| 4,966,340 | 10/1990 | Hunter | 5/503 X |

Primary Examiner—Ramon O. Ramirez
Attorney, Agent, or Firm—Irving Keschner

[57] ABSTRACT

A device comprising a bracket having a clamp secured thereto, the bracket portion of the device being attached to a hospital bed or gurney. An IV pole is attached to the device by the clamp portion of the device in a manner such that it is supported above the surface of the hospital floor.

8 Claims, 1 Drawing Sheet

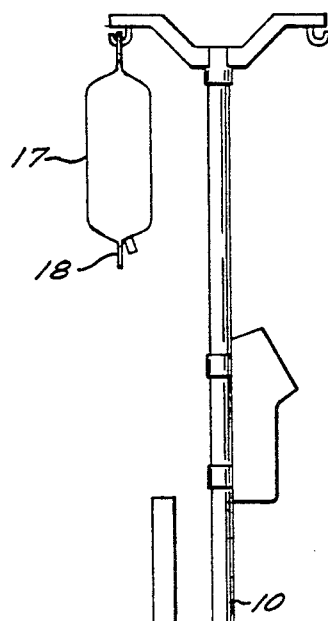
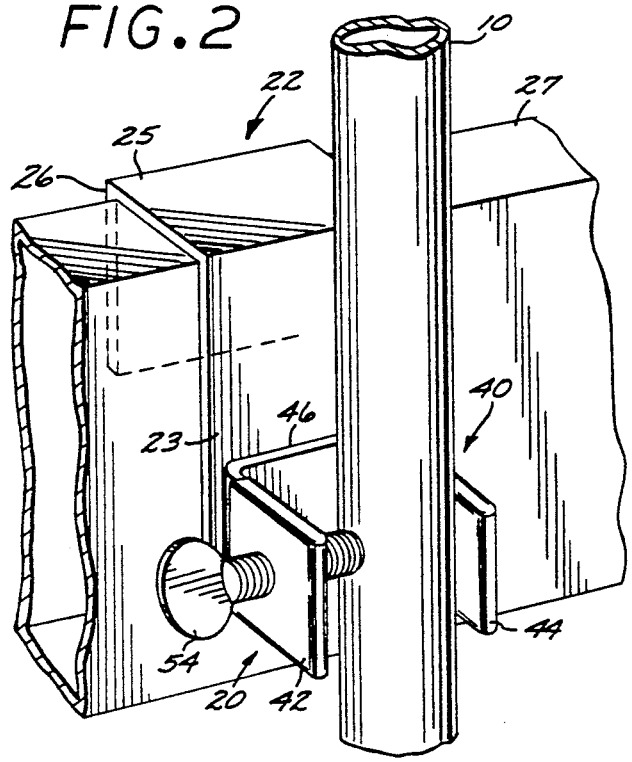
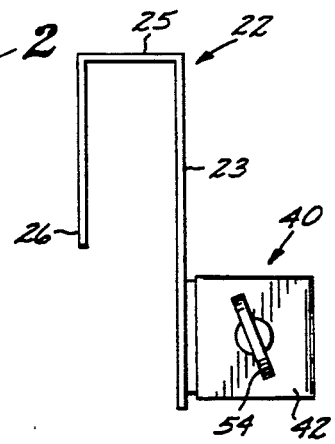
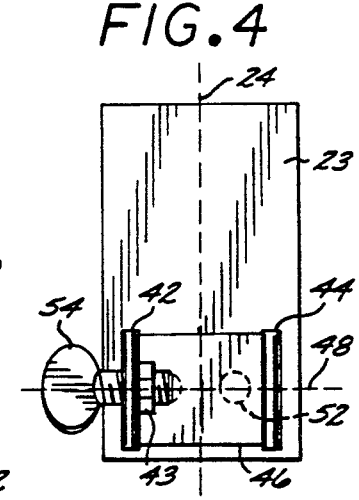
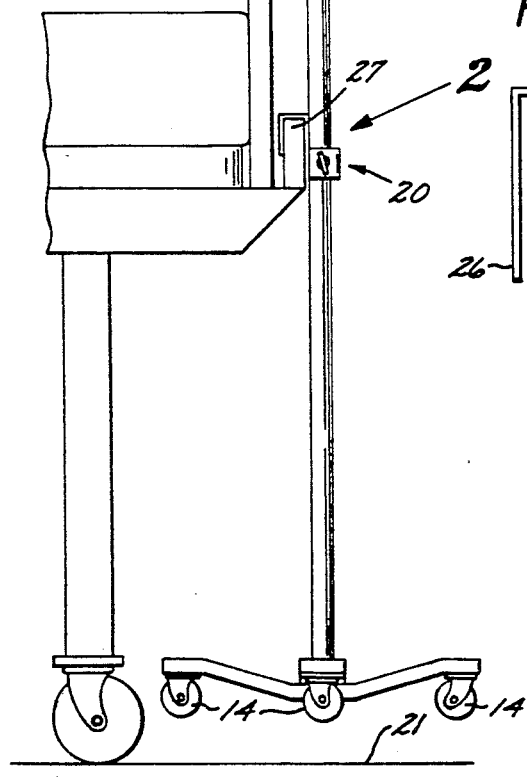

DEVICE FOR ATTACHING AN IV POLE TO A HOSPITAL BED OR THE LIKE

BACKGROUND OF THE INVENTION

1. Field of the Invention

The present invention relates to a device having a clamp portion attached to a hospital bed or gurney and a bracket portion for supporting an IV pole above the floor.

2. Description of the Prior Art

During hospital medical treatment, it is often necessary to infuse liquids into a patient intravenously. Such infusion is normally carried out through the use of a disposable administration bag which is hung from an IV pole and filled with the desired infusion fluid which is conducted to the patient via a flexible tubing and a hypodermic needle.

In various types of hospital situations it is necessary to transport a patient on a hospital bed or a gurney from one location to another in the hospital. In this case, the pole is typically connected to a weighted base having casters thereon. The casters contact the floor and personnel are required to assist in transporting a patient and to manually move the IV pole alongside the bed or gurney. This in turn leads to the possibility of accidental disconnection of needles and lines causing patient contamination and discomfort. In addition, the various lines associated with the pole mounted equipment could become entangled as the bed/gurney is moved separately from the adjacent IV pole.

U.S. Pat. No. 4,706,368 to Crisman et al discloses a support bracket for securely mounting an IV sensor to an IV pole to prevent the flow sensor and drop chamber from tilting during use; U.S. Pat. No. 4,998,277 to Rioux discloses a bracket for mounting onto a hospital bed railing assembly for supporting a one-piece telephone instrument. However, neither patent discloses a device for securing an IV pole to a hospital bed or gurney in a manner to minimize the risk of accidental disconnection of IV lines from a patient.

What is therefore desired is to provide a device which eliminates the need of having extra personnel available to transport a patient confined to a hospital bed or gurney and to push or pull a separately moveable IV pole thus decreasing both the possibility of accidental disconnections of needles and lines and the entanglement of the IV lines.

SUMMARY OF THE INVENTION

The present invention provides a support device comprising a bracket and a U-shaped clamp member attached to the bracket, the bracket being attached to a patient's bed or gurney. An IV pole is supported in a vertically extending direction by the U-shaped clamp member, a thumb screw being utilized to firmly engage the pole. One of the leg members forming the U-shaped clamp member has a lip portion to provide a further technique of securing the pole within the clamp member. The thumb screw is adjusted in a manner such that the portion of the IV pole base member normally contacting the hospital floor, i.e., the casters, are supported above the hospital floor while transporting patients, the bed or gurney acting as an integral unit.

The support device of the present invention is simple and inexpensive yet provides significant advantages when used in a hospital setting. In particular, the use of the support device eliminates the necessity of having extra personnel to assist in transporting a patient because the IV pole(s) no longer has to be manually moved alongside or behind the hospital bed; the potential for accidental disconnection of needles and lines is substantially decreased; and the possibility of IV lines becoming entangled while transporting the patient is substantially eliminated.

DESCRIPTION OF THE DRAWINGS

For a better understanding of the invention as well as other objects and further features thereof, reference is made to the following description which is to be read in conjunction with the accompanying drawing wherein:

FIG. 1 is a perspective view of a typical intravenous administration system, including an administration bag and IV pole, utilizing the support device of the present invention;

FIG. 2 is an enlarged perspective view of FIG. 1 showing the support device of the present invention in more detail;

FIG. 3 is a side view of the support device of the present invention;

FIG. 4 is a front view of the support device of the present invention; and

FIG. 5 is a plan view of the support device of the present invention.

DETAILED DESCRIPTION OF THE INVENTION

Referring now to FIG. 1, IV pole 10 has a weighted base 12, the base 12 typically having a plurality of casters 14 thereon to enable the IV pole 10 to be transported along the hospital floor at the same time as the patient is being moved in a bed or gurney. IV pole 10 typically includes a vertical section and standard components supported thereon including administration bag 17 and tubing 18 which conducts fluid to the patient. In accordance with the teachings of the present invention, device 20 is adjusted in a manner to position casters 14 above the hospital floor surface 21 as illustrated.

Typically, when a patient must be transported from one location to another in the hospital bed, gurney, or the like (the phrase "hospital bed" will be used hereinafter and is intended to include all devices used to transport a patient and which requires an adjacent IV line), separate personnel are used to move the hospital bed and the adjacent IV pole, the hospital bed and IV pole being separately moveable. To avoid the problem of having the hospital bed and IV pole move at a different rate whereof the risk that the lines connecting the fluids to the patient may be inadvertently removed, entangled, etc. device 20 connects the IV pole 10 to the hospital bed so that both move in unison and wherein the weighted bottom of the IV pole is positioned above the hospital floor 21. With particular reference to FIGS. 2-5, device 20 comprises a bracket member 22, preferably made of stainless steel, having an elongated side portion 23 extending along a vertical or longitudinal axis 24, a base portion 25 substantially orthogonal to portion 23 and a spaced apart side portion 26 substantially parallel to side portion 22. The space between side portions 23 and 26 (about 1.25 inches) is arranged to be sufficient to engage a hospital bed support rail 27.

Device 20 further comprises a U-shaped clamping member 40, also preferably made of stainless steel, having parallel leg members 42 and 44 and a base member 46 extending orthogonally between leg members 42 and 44 as illustrated (plastic grips for holding IV pole 10 more securely is shown positioned over legs 42 and 44). Base member 46 extends in a direction along longitudinal axis 48, leg member 44 having a lip portion 50 as illustrated. Clamping member 40 is rigidly attached to bracket member 22 preferably by utilizing four spot welds (only a single weld 52 is illustrated) to join base member 46 to elongated side portion 23. Although welding is a preferred joining technique, other techniques, such as riveting, may be utilized. A threaded thumb screw 54 is provided to mesh with threaded bore in leg 42 of clamping member 40 which is dimensioned to engage IV pole 10. A hexhead nut 43 is welded to leg member 42 to provide additional support for thumb screw 54.

In use clamping member 40 is secured to IV pole 10 by loosening thumb screw 54 and then tightening it to finally engage the pole in a manner such that casters 14 are positioned above the hospital floor as shown in FIG. 1, lip portion 50 providing an additional means to ensure that pole 10 does not disengage from clamping member 40 after thumb screw 54 is tightened. Device 20 is then positioned next to the hospital bed such that bracket 22 can be secured to hospital bed rail 27 as illustrated. Obviously, the bracket 22 can first be attached to the hospital bed rail 27 before clamping member 40 engages IV pole 10.

The present invention thus provides a simple and economical device for minimizing the risk that the feeding lines extending from an IV pole will be inadvertently removed or entangled as the patient is transported in a hospital bed from location to location.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A method for connecting an IV pole to a patient transport device in a manner such that the IV pole moves together with the patient transport device and wherein the bottom of the IV pole is positioned above the hospital floor surface comprising the steps of:

providing a vertically extending IV pole having a base member;

providing a device for attaching said IV pole to said patient transport device in a manner such that said base member is above said floor surface, said device comprising a bracket member, said bracket member having an elongated first side portion, a base portion substantially orthogonal to said first side portion and a spaced apart second side portion substantially parallel to said first elongated portion, the space between said first and second side portions being selected such that the bracket portion can be attached to said patient transport device, said device further comprising a U-shaped clamp member comprising first and second leg members and a base member, said base member being rigidly attached to the elongated side portion of said bracket member, a threaded bore being formed in said first leg member and a thumb screw for engaging said threaded bore;

attaching said bracket portion to said patient transport device;

disengaging said thumb screw so that said IV pole is positionable within the opening formed between said first and second leg members of said clamp member; and positioning said IV pole within said opening and engaging said thumb screw such that said IV pole is secured to said clamp member at a position whereby said base member is supported above the hospital floor surface.

2. The method of claim 1 wherein said second leg portion of said clamp member has a lip portion substantially parallel to said base member whereby said IV pole is further secured within the clamp member opening.

3. The method of claim 2 wherein the base of said clamp member and said elongated first side portion of said base member have longitudinal axes which are orthogonal to each other.

4. A device for connecting an IV pole to a patient transport device or the like in a manner such that the IV pole moves together with the patient transport device and wherein the base member of the IV pole is positioned above the hospital floor surface comprising a bracket member, said bracket member having an elongated first side portion, a base portion substantially orthogonal to said first side portion and a spaced apart second side portion substantially parallel to said first elongated portion, the space between said first and second side portions being selected such that the bracket portion can be attached to said patient transport device, said device further comprising a U-shaped clamp member comprising first and second leg members and a base member, said base member being rigidly attached to the elongated side portion of said bracket member, a threaded bore being formed in said first leg member; and a thumb screw for engaging said threaded bore, said thumb screw being disengageable so that an IV pole can be positioned within the opening formed between said first and second leg members of said clamp member, tightening of said thumb screw thereafter securing said IV pole to said clamp member at a position whereby said IV pole base member is supported above the hospital floor surface.

5. The device of claim 4 wherein said second leg portion of said clamp member has a lip portion substantially parallel to said base member whereby said IV pole is further secured within the clamp member opening.

6. The device of claim 5 wherein the base of said clamp member and said elongated first side portion of said base member have longitudinal axes which are orthogonal to each other.

7. The method of claim 1 wherein said second leg portion of said clamp member has a portion extending from the end spaced from said base member in a direction substantially parallel to said base member wherein said IV pole is further secured within the clamp member opening.

8. The device of claim 4 wherein said second leg portion of said clamp member has a portion extending from the end spaced from said base member in a direction substantially parallel to said base member whereby said IV pole is further secured within the clamp member opening.

* * * * *